United States Patent
Lee et al.

(10) Patent No.: US 10,587,010 B2
(45) Date of Patent: Mar. 10, 2020

(54) RECHARGEABLE BATTERY AND RECHARGEABLE BATTERY MODULE

(71) Applicant: SAMSUNG SDI CO., LTD., Yongin-si, Gyeonggi-do (KR)

(72) Inventors: Chi-Young Lee, Yongin-si (KR); Myung-Jae Jang, Yongin-si (KR); Sang-Won Byun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 134 days.

(21) Appl. No.: 15/157,276

(22) Filed: May 17, 2016

(65) Prior Publication Data
US 2016/0372793 A1 Dec. 22, 2016

(30) Foreign Application Priority Data
Jun. 22, 2015 (KR) ........................ 10-2015-0088348

(51) Int. Cl.
*H01M 10/0585* (2010.01)
*H01M 2/02* (2006.01)
*H01M 2/04* (2006.01)

(52) U.S. Cl.
CPC ..... *H01M 10/0585* (2013.01); *H01M 2/0212* (2013.01); *H01M 2/04* (2013.01)

(58) Field of Classification Search
None
See application file for complete search history.

(56) References Cited

U.S. PATENT DOCUMENTS

2010/0216008 A1* 8/2010 Yoon ............... H01M 2/206
429/158
2011/0104556 A1* 5/2011 Kim ................. H01M 2/1077
429/160
(Continued)

FOREIGN PATENT DOCUMENTS

CN 103515645 A 1/2014
DE 3421025 A1 12/1984
(Continued)

OTHER PUBLICATIONS

Partial English Translation of relevant parts of DE 3421025 A1 dated Dec. 13, 1984, listed above, (4 pages).
(Continued)

*Primary Examiner* — Barbara L Gilliam
*Assistant Examiner* — Zhongqing Wei
(74) *Attorney, Agent, or Firm* — Lewis Roca Rothgerber Christie LLP

(57) ABSTRACT

A rechargeable battery including: an electrode assembly including a first electrode, a second electrode, and a separator between the first electrode and the second electrode; a case accommodating the electrode assembly; a cap plate sealing an opening of the case; a first sub-terminal including a first portion and a second portion integrally formed with the first portion, the first portion being arranged at one end of the cap plate and the second portion being arranged at an outer surface of the case; and a second sub-terminal including a third portion and a fourth portion integrally formed with the third portion, the third portion being arranged at another end of the cap plate and the fourth portion being arranged at another outer surface of the case.

12 Claims, 9 Drawing Sheets

(56) References Cited

U.S. PATENT DOCUMENTS

| | | | |
|---|---|---|---|
| 2011/0294001 A1* | 12/2011 | Byun | H01M 2/06 |
| | | | 429/181 |
| 2013/0273411 A1 | 10/2013 | Kim | |
| 2013/0309539 A1* | 11/2013 | Yoshioka | H01G 11/52 |
| | | | 429/99 |
| 2013/0337306 A1 | 12/2013 | Han et al. | |
| 2014/0127551 A1 | 5/2014 | Kim | |
| 2014/0356691 A1* | 12/2014 | Ahn | H01M 2/305 |
| | | | 429/158 |
| 2015/0280336 A1 | 10/2015 | Itou et al. | |
| 2016/0056430 A1 | 2/2016 | Burkman | |

FOREIGN PATENT DOCUMENTS

| | | |
|---|---|---|
| DE | 3421025 C2 | 6/1987 |
| KR | 10-2009-0011994 A | 2/2009 |
| KR | 10-2009-0075403 A | 7/2009 |
| WO | WO 2014/054203 A1 | 4/2014 |

OTHER PUBLICATIONS

EPO Extended Search Report dated Sep. 20, 2016, for corresponding European Patent Application No. 16175336.3 (5 pages).
EPO Office Action dated Feb. 12, 2018, for corresponding European Patent Application No. 16175336.3 (4 pages).
SIPO Office Action, with English translation, dated Dec. 18, 2019, for corresponding Chinese Patent Application No. 201610421146.2 (17 pages).

* cited by examiner

RECHARGEABLE BATTERY AND RECHARGEABLE BATTERY MODULE

CROSS-REFERENCE TO RELATED APPLICATION

This application claims priority to and the benefit of Korean Patent Application No. 10-2015-0088348, filed in the Korean Intellectual Property Office on Jun. 22, 2015, the entire content of which is incorporated herein by reference.

BACKGROUND

1. Field

The described technology relates generally to a rechargeable battery and a rechargeable battery module.

2. Description of the Related Art

A rechargeable battery differs from a primary battery, which is not designed to be recharged, in that the rechargeable battery is designed to be repeatedly charged and discharged, and the rechargeable battery has been actively researched to be applied to various high-tech fields and to be commercially available to be widely used.

For example, high power rechargeable batteries using a non-aqueous electrolyte and having relatively high energy density have recently been developed, and a plurality of high power rechargeable batteries may be coupled to each other in series to be used in equipment requiring power storage or a high amount of electric power, thereby forming a high power, large capacity battery module.

Such a rechargeable battery is manufactured in various shapes, and typical shapes thereof include a cylindrical shape, a rectangular shape, and a pouch shape. The cylindrical and rectangular shape high-capacity batteries are generally used in medium and large modules requiring a relatively large amount of power.

Each rechargeable battery generally includes an electrode assembly formed by interposing a separator, acting as an insulator, between a positive electrode and a negative electrode, a case receiving the electrode assembly and an electrolyte solution, a cap plate coupled to the case and closing and sealing the case, and an electrode terminal protruding from the cap plate and electrically connected to one of the positive electrode and the negative electrode of the electrode assembly.

Generally, when configuring a medium or large battery module by electrically connecting a plurality of rechargeable batteries to each other, the rechargeable batteries are electrically connected to each other by using a connection member after adhering a plate-type terminal to the electrode terminal protruding out of each battery (e.g., protruding to an upper space above each battery) or by disposing a connection line and a circuit configuration of the battery module in the upper space above the respective battery, such that a height of the battery module is increased.

However, in an electric vehicle using the medium or large battery module, when the height of the battery module is increased as described above, suitable placement locations and/or orientations of the battery module are limited. Also, because the body height of the electric vehicle applied with this battery module is increased, there is a problem that it may not meet the various requirements of the customer.

The above information disclosed in this Background section is only for enhancement of understanding of the background of the described technology, and therefore, it may contain information that does not form the prior art.

SUMMARY

The present disclosure provides a rechargeable battery having a structure that has a relatively low height by utilizing upper and side spaces thereof to provide a battery module having a relatively low height.

One embodiment of the present disclosure provides a rechargeable battery including: an electrode assembly including a first electrode, a second electrode, and a separator between the first electrode and the second electrode; a case accommodating the electrode assembly; a cap plate sealing an opening of the case; a first sub-terminal including a first portion and a second portion integrally formed with the first portion, the first portion being arranged at one end of the cap plate and the second portion being arranged at an outer surface of the case; and a second sub-terminal including a third portion and a fourth portion integrally formed with the third portion, the third portion being arranged at the other end of the cap plate and the fourth portion being arranged at another outer surface of the case.

A second terminal may extend through and protrude from the cap plate, and the second terminal may be electrically connected to the second electrode. The third portion may have an opening therein, and the second terminal may extend into the opening.

The first portion may include an insertion portion, and the insertion portion may have a first terminal inserted therein. The first terminal may be electrically connected to the first electrode.

The first terminal may extend through and protrude from the cap plate, and the first terminal may be electrically connected to the first electrode. The first portion may have an opening therein into which the first terminal may penetrate.

The second sub-terminal may have a shape in which the third portion and the fourth portion are bent with respect to each other.

The first sub-terminal may have a shape in which the first portion and the third portion are bent with respect to each other.

The fourth portion and the second terminal may be respectively arranged on surfaces which are perpendicular to each other.

The second portion and the first terminal may be respectively arranged on surfaces which are perpendicular to each other.

Another embodiment of the present disclosure provides a rechargeable battery module including a plurality of rechargeable batteries and a connection member electrically connecting ones of the plurality of rechargeable batteries.

The connection member may include a first connection member coupled to an external surface of the second portion of the first sub-terminal of adjacent ones of the rechargeable batteries, and a second connection member alternately arranged with respect to the first connection member and coupled to an external surface of the fourth portion of the second sub-terminal of adjacent ones of the rechargeable batteries.

Another embodiment of the present disclosure provides a rechargeable battery including: an electrode assembly including a first electrode, a second electrode, and a separator between the first electrode and the second electrode; a case accommodating the electrode assembly; a cap plate sealing an opening of the case; a first sub-terminal on one end of the cap plate and extending to be adjacent an outer surface of the case; and a second sub-terminal on another end of the cap plate and extending to be adjacent another outer surface of the case.

In an embodiment of the rechargeable battery of the present disclosure, the shape of the terminal coupled to the connection member which electrically connects adjacent ones of the rechargeable batteries to each other is such that a portion of the terminal is at a side of the case perpendicular to the electrode terminal, thereby reducing the height of a battery module using rechargeable batteries according to this embodiment.

Further, the rechargeable battery according to an embodiment of the present disclosure includes a bent terminal such that the upper space and the side space adjacent the battery may be utilized, thereby reducing a height of a battery module using rechargeable batteries according to this embodiment and providing improving ease to the user.

DETAILED DESCRIPTION

Figure 1:
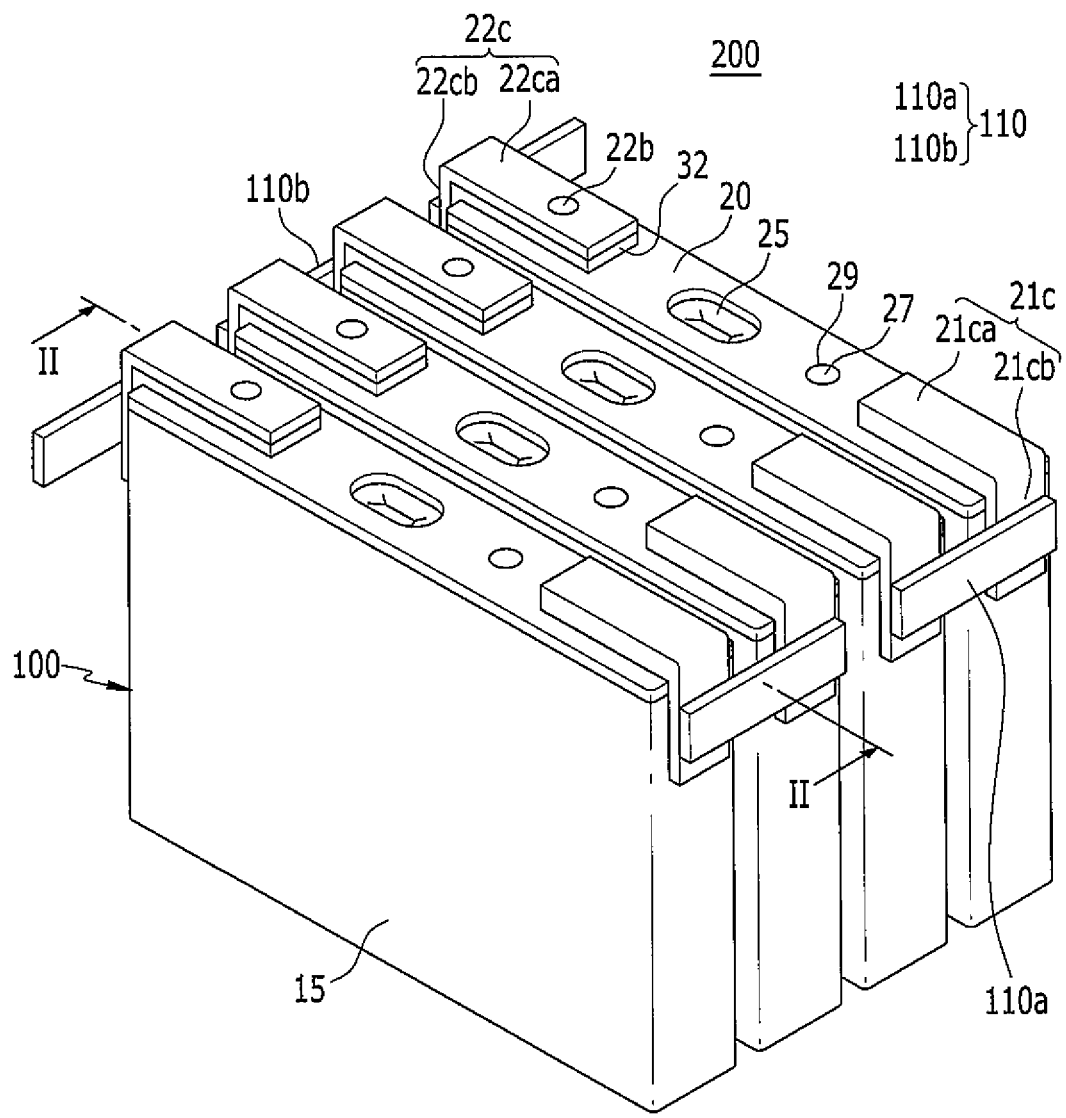
FIG. 1 is a perspective view of a rechargeable battery module according to an exemplary embodiment.

The present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure. The drawings and description are to be regarded as illustrative in nature and not restrictive. Like reference numerals designate like elements throughout the specification.

It will be understood that when an element or layer is referred to as being "on," "connected to," or "coupled to" another element or layer, it may be directly on, connected, or coupled to the other element or layer or one or more intervening elements or layers may also be present. When an element is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Figure 2:
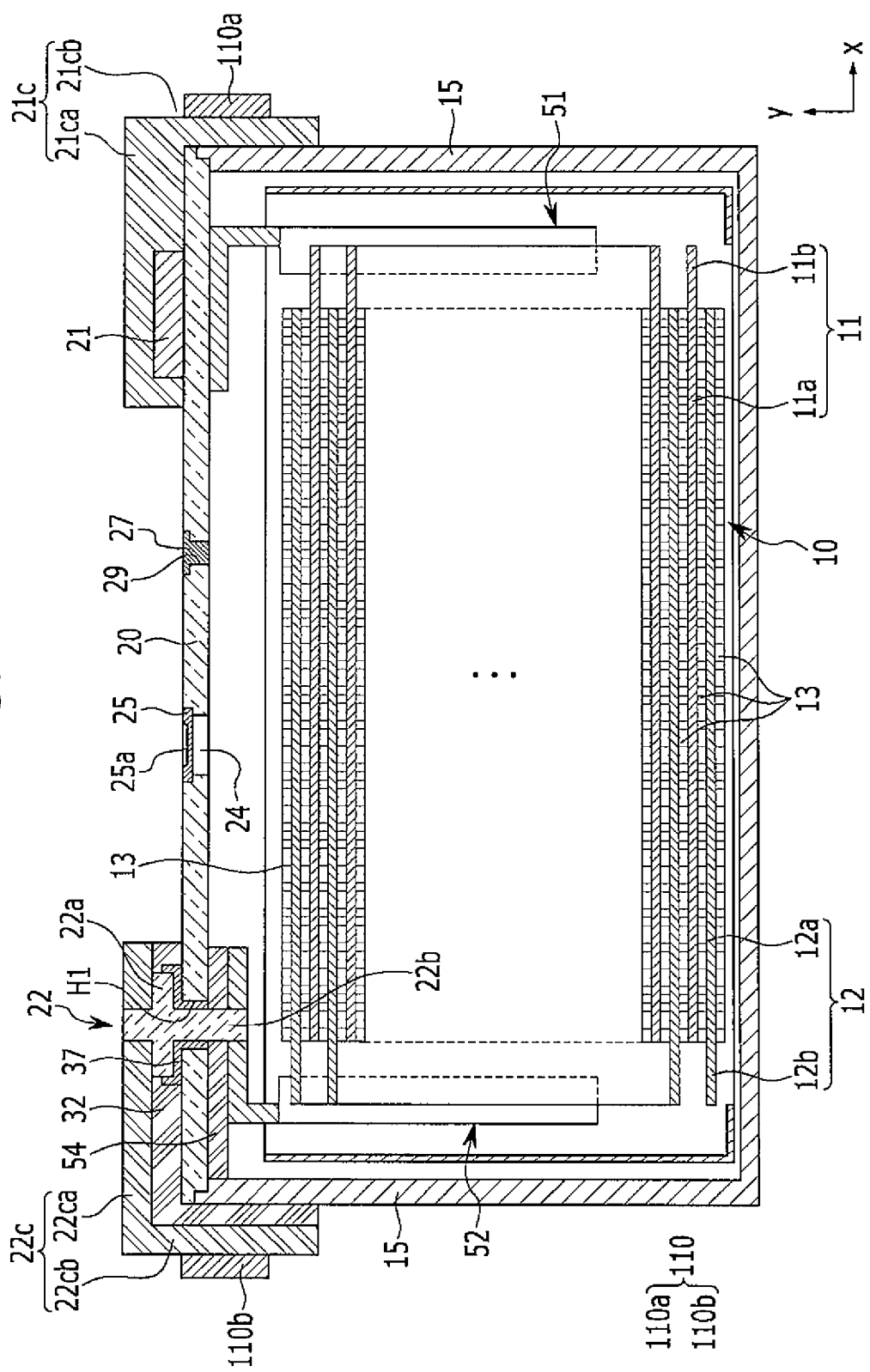
FIG. 2 is a cross-sectional view taken along the line II-II of FIG. 1.

FIG. 1 is a perspective view of a rechargeable battery module according to an exemplary embodiment, and FIG. 2 is a cross-sectional view taken along the line II-II of FIG. 1.

Referring to FIG. 1 and FIG. 2, a rechargeable battery module 200 according to an exemplary embodiment of the present disclosure includes a plurality of rechargeable batteries 100 and connection members 110b and 110a electrically connecting the plurality of rechargeable batteries 100 to each other (e.g., electrically connecting adjacent ones of the plurality of rechargeable batteries 100 to each other). A fourth portion 22cb of a second sub-terminal 22c having a bent shape and a second portion 21cb of a first sub-terminal 21c, respectively, are coupled to (e.g., adhered to) opposite ends (e.g., opposite end surfaces) of each of the plurality of rechargeable batteries 100. According to aspects of the present disclosure, the connection members 110a and 110b, electrically connecting the plurality of rechargeable batteries 100, may be arranged at side spaces adjacent the respective rechargeable batteries 100 (e.g., may be arranged at a side space of the rechargeable battery module 200) and may not be arranged at upper spaces adjacent the respective rechargeable batteries 100 (e.g., may not be arranged at an upper space of the rechargeable battery module 200).

In one embodiment, the connection members 110a and 110b may include a first connection member 110a adhered to an external surface (e.g., an external peripheral surface or an external circumferential surface) of the second portion 21cb of two adjacent rechargeable batteries 100 and a second connection member 110b adhered to an external surface (e.g., an external peripheral surface or an external circumferential surface) of the fourth portion 22cb of the two alternately adjacent rechargeable batteries 100. The first connection member 110a and the second connection member 110b may be alternately disposed with respect to each other (e.g., the first connection member 110a may electrically connect two adjacent rechargeable batteries 100 and the second connection member 110b may electrically connect one of the two adjacent rechargeable batteries 100 with a third rechargeable battery 100).

FIG. 1 shows each of the connection members 110a and 110b connecting two rechargeable batteries 100 to each other. However, in the rechargeable battery module 200 according to an exemplary embodiment, at least three or more, or four or more, etc., rechargeable batteries 100 may be electrically connected by the connection members 110a and 110b, and the shape of the module (e.g., an arrangement of the plurality of rechargeable batteries 100) is not particularly limited.

As described above, because the rechargeable battery module 200 according to an exemplary embodiment includes the connection members 110a and 110b arranged at the side space of the module, the entire height of the battery module may be reduced.

Figure 3:
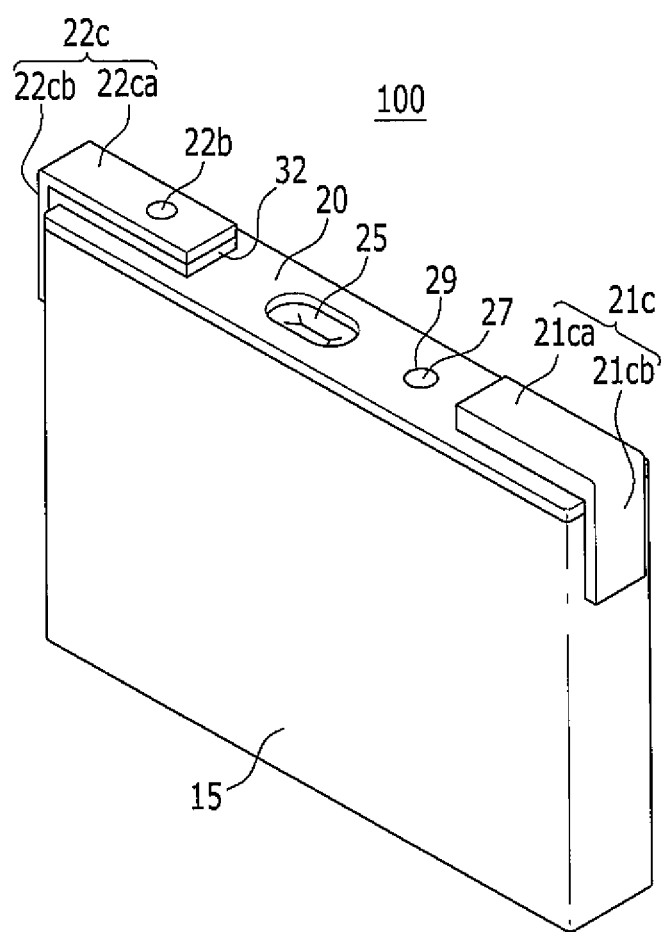
FIG. 3 is a perspective view of a rechargeable battery according to an exemplary embodiment.

FIG. 3 is a perspective view of a rechargeable battery according to an exemplary embodiment.

Referring to FIG. 2 and FIG. 3, the rechargeable battery 100 according to an exemplary embodiment includes an electrode assembly 10 for charging and discharging a current, a case 15 receiving the electrode assembly 10, and a cap plate 20 coupled to an opening of the case 15. The first sub-terminal 21c and the second sub-terminal 22c are positioned at opposite ends of the cap plate 20 and face outward from the rechargeable battery 100.

Although a rectangular battery is illustrated herein, the present disclosure is not limited thereto. The present disclosure may be applied to various rechargeable batteries, such as a pouch battery and a cylindrical battery.

First, the electrode assembly 10 may be formed by arranging a first electrode (hereinafter referred to as "a positive electrode") 11 and a second electrode (hereinafter referred to as "a negative electrode") 12 on respective surfaces of a separator 13 being an insulator, spiral-winding the positive electrode 11, the separator 13, and the negative electrode 12, and then flatly pressing them.

The negative and positive electrodes 11 and 12 include respective coated regions 11a and 12a formed by applying an active material to a current collector made of, for example, a metal plate, and include respective uncoated regions 11b and 12b which are exposed portions of the current collector to which the active material is not applied.

In one embodiment, the positive electrode current collector may be made of a thin metal plate, such as aluminum, and the positive electrode active material layer may be a lithium-based oxide. Also, the negative electrode current collector may be made of a thin metal plate, such as copper, and the negative active material may be a carbon-based active material. Furthermore, the separator 13 may be made of a porous thin film, for example, a polyolefin-based resin.

The uncoated region 11b of the positive electrode 11 is formed on one end of the spiral-wound positive electrode 11. The uncoated region 12b of the negative electrode 12 is formed on one end of the spiral-wound negative electrode 12. Accordingly, the uncoated regions 11b and 12b are arranged at opposite ends of the electrode assembly 10.

The case 15 is formed (e.g., substantially formed) having a cuboid shape in which a space for accommodating the electrode assembly 10 and an electrolyte solution is formed, and the case 15 has an opening that connects inner and outer spaces thereof. The opening allows the electrode assembly 10 to be inserted into the case 15.

The cap plate 20 has a plate shape and is provided at (e.g., in) the opening of the case 15 to close and seal the case 15. The case 15 and the cap plate 20 may be formed of the same material, for example, of aluminum, such that they can be welded to each other.

In addition, the cap plate 20 is provided with an electrolyte injection opening 29, a vent hole 24, and a terminal opening H1 (e.g., a terminal hole). After combining the cap plate 20 to the case 15, the electrolyte injection opening 29 allows the electrolyte solution to be injected into the case 15. After the electrolyte solution is injected, the electrolyte injection opening 29 is sealed with a sealing cap 27.

The vent hole 24 is sealed with a vent plate 25 so as to selectively discharge internal pressure of the rechargeable battery 100. If the internal pressure of the rechargeable battery 100 reaches a certain pressure (e.g., a predetermined pressure), the vent plate 25 ruptures to open the vent hole 24. Accordingly, the vent plate 25 is provided with a notch 25a that induces the rupture.

A second terminal 22 is installed in the terminal opening H1 of the cap plate 20 and is electrically connected to the negative electrode 12 of the electrode assembly 10. Thus, the negative electrode 12 of the electrode assembly 10 is drawn out of the case 15 through the second terminal 22.

For example, the second terminal 22 includes a second column terminal 22b installed in (e.g., extending through) the terminal opening H1 of the cap plate 20 and a second flange 22a integrally formed with the second column terminal 22b outside of the cap plate 20 and flatly protruding in a horizontal direction with respect to the second column terminal 22b. The second flange 22a is inserted and disposed in a second insulating member 32 and is also inserted and disposed in a negative electrode gasket 37 on the cap plate 20.

Also, the negative electrode gasket 37 seals between and electrically insulates the second column terminal 22b and the cap plate 20. Further, by installing the second terminal 22 in the cap plate 20, the negative electrode gasket 37 may prevent the electrolyte solution from leaking through the terminal opening H1.

A negative electrode lead tab 52 electrically connects the second terminal 22 to the negative electrode 12 of the electrode assembly 10. For example, the negative electrode lead tab 52 may be connected to the lower end of the second column terminal 22b by caulking.

A negative electrode insulating member 54 is installed between the negative electrode lead tab 52 and the cap plate 20 to electrically insulate the negative electrode lead tab 52 and the cap plate 20. Also, the negative electrode insulating member 54 is coupled to the cap plate 20 at one side thereof and encloses the negative electrode lead tab 52 and the second column terminal 22b at the other side thereof to stabilize the connection structure thereof.

A first terminal 21 may be formed of a protrusion that protrudes at (e.g., from) an outer surface of the cap plate 20 by processing the cap plate 20, and as shown in FIG. 3, the first terminal 21 may be manufactured to have a rectangular plate shape having a thickness (e.g., a predetermined thickness) to be adhered to the cap plate 20 by using the same material as the cap plate 20.

In one embodiment, a positive electrode lead tab 51 is directly connected to the inside of the cap plate 20 such that the cap plate 20 and the case 15 may be charged as the positive electrode (e.g., may be positively biased). Accordingly, the positive electrode 11 of the electrode assembly 10 may be electrically connected to the first terminal 21 through the cap plate 20.

Figure 4:
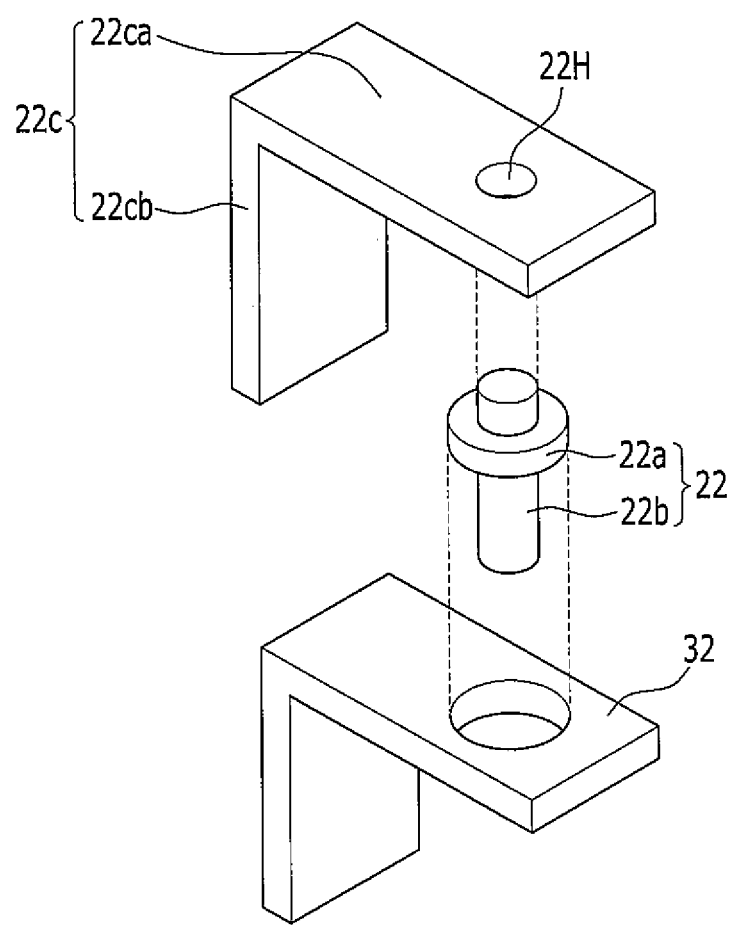
FIG. 4 is an exploded perspective view of a second sub-terminal according to an exemplary embodiment.
Figure 5:
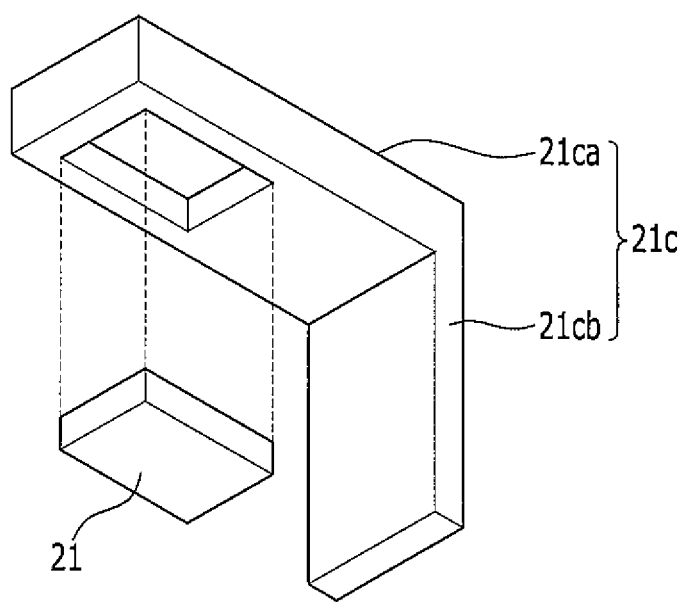
FIG. 5 is an exploded perspective view of a first sub-terminal according to an exemplary embodiment.

FIG. 4 is an exploded perspective view of a second terminal according to an exemplary embodiment, and FIG. 5 is an exploded perspective view of a first terminal according to an exemplary embodiment.

Referring to FIG. 3 to FIG. 5, according to embodiments of the present disclosure, the second sub-terminal 22c and the first sub-terminal 21c each have at least two attached surfaces (e.g., at least two portions extending in different directions with respect to each other).

For example, as shown in FIG. 4, the second sub-terminal 22c includes a third portion 22ca attached to one end of the cap plate 20 and the fourth portion 22cb integrally formed with the third portion 22ca and attached to an outer surface of the case 15 (e.g., an outside surface end of the case 15).

In this embodiment, the third portion 22ca may have an opening 22H (e.g., a through-hole) positioned to be inserted with a head of the second terminal 22 which penetrates the cap plate 20 and is electrically connected to the negative electrode 12 of the electrode assembly 10. In this embodiment, the second terminal 22 is formed so as to not protrude from the surface of the third portion 22ca (e.g., the second terminal 22 has a flat upper end so as to not protrude from an upper surface of the third portion 22ca).

Also, the second insulating member 32 is inserted between the third portion 22ca and one end of the cap plate 20 and between the fourth portion 22cb and the outer surface of the case 15 to electrically insulate the cap plate 20 and the case 15 from the second sub-terminal 22c.

In one embodiment, the third portion 22ca and the fourth portion 22cb may be formed as one body (e.g., may be integrally formed) and may have a bent shape (e.g., may be bent at a predetermined angle).

As shown in FIG. 5, the first sub-terminal 21c includes a first portion 21ca positioned at the other end of the cap plate 20 with respect to the third portion 22ca of the second sub-terminal 22c and the second portion 21cb integrally formed with the first portion 21ca and positioned at another outer surface of the case 15 (e.g., at an opposite outside surface of the case 15 with respect to the fourth portion 22cb). For example, the other end of the cap plate 20 is the end facing the outer surface at which the third portion 22ca of the above-described second terminal is arranged, and the other outer surface of the case 15 is the surface of the case 15 opposite the outer surface at which the fourth portion 22cb is arranged.

In this embodiment, the first portion 21ca may include an insertion part (e.g., a groove or opening) where (e.g., corresponding to where) the first terminal 21 formed at one end of the cap plate 20. According to an exemplary embodiment, the surfaces of the first terminal 21 except for the surface where the first terminal 21 is attached to (e.g., extends from) the cap plate 20 are inserted into the insertion portion and are enclosed by the first portion 21ca of the first sub-terminal 21c (e.g., the exposed surfaces of the first terminal 21 are inserted into the insertion part and are enclosed by the first portion 21ca).

In one embodiment, the first portion 21ca and the second portion 21cb are integrally formed with each other and may have a bent shape (e.g., may be bent at a predetermined angle).

Figure 6:
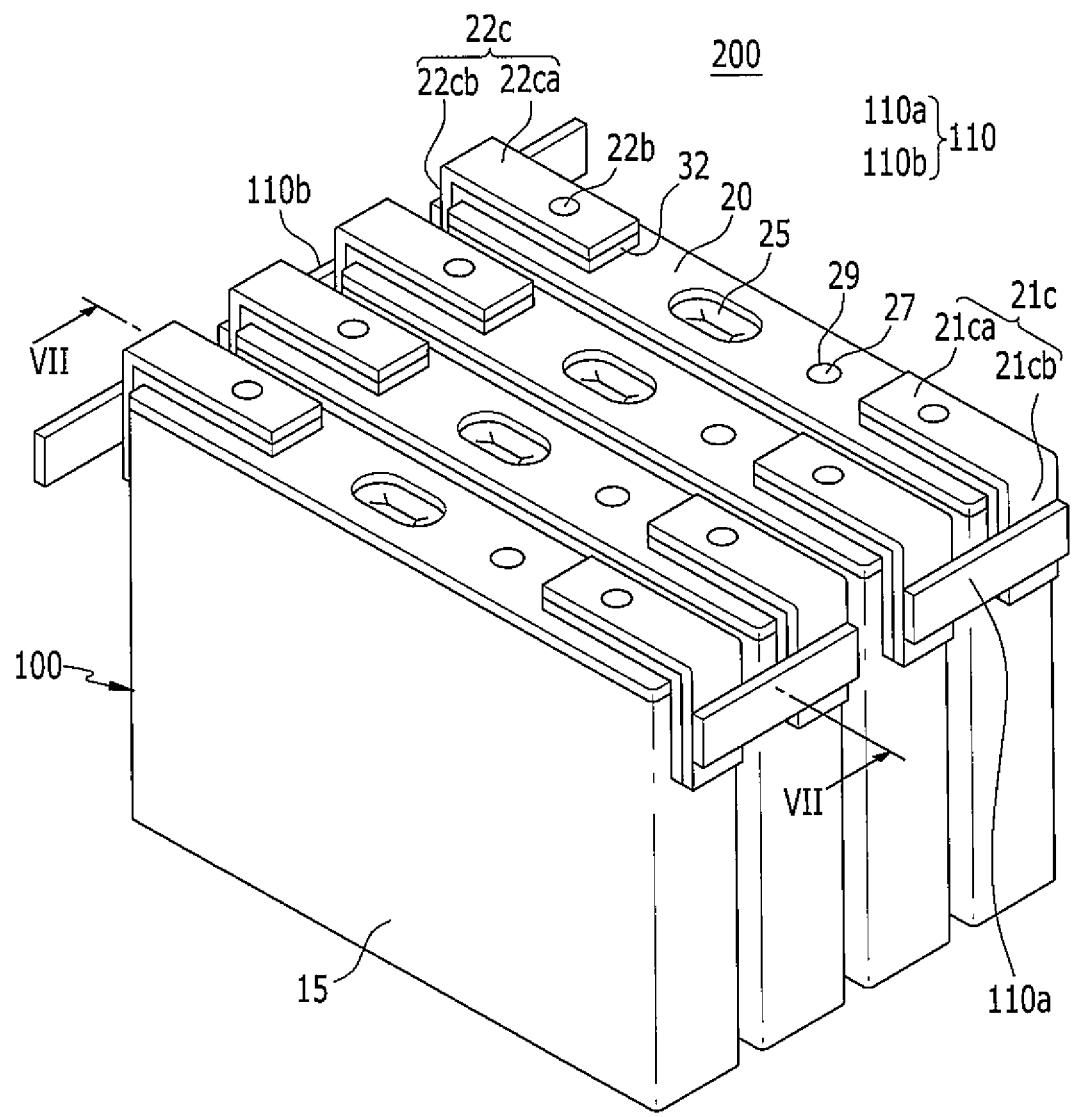
FIG. 6 is a perspective view of a rechargeable battery module according to another exemplary embodiment.
Figure 7:
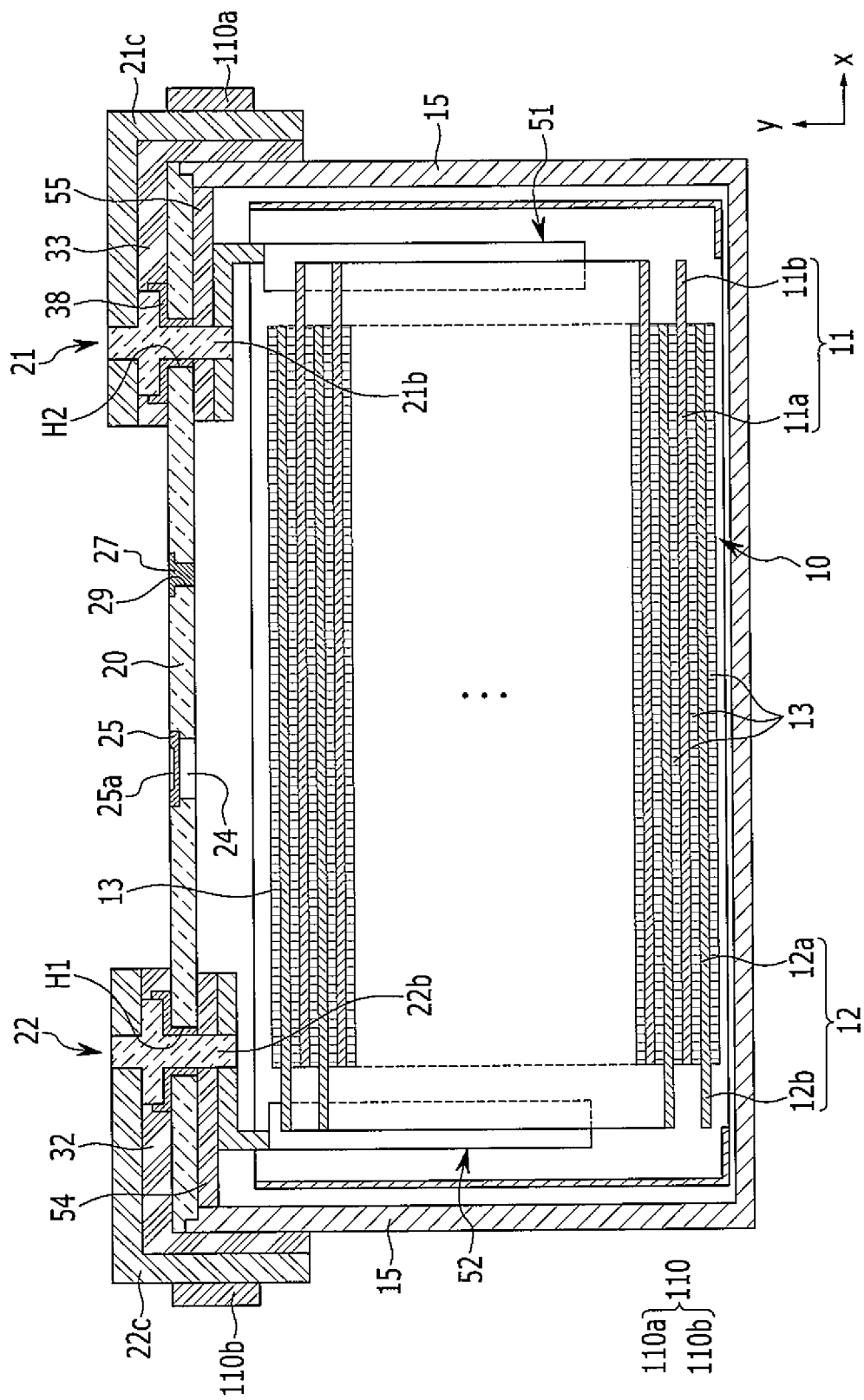
FIG. 7 is a cross-sectional view taken along the line VII-VII of FIG. 6.
Figure 8:
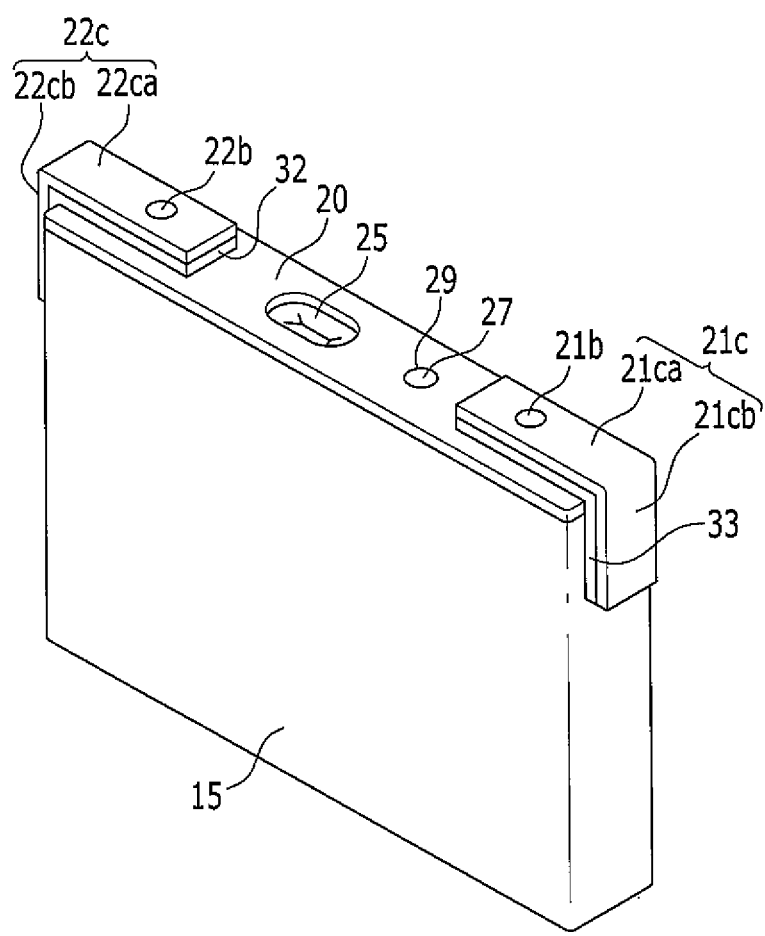
FIG. 8 is a perspective view of a rechargeable battery according to another exemplary embodiment

FIG. 6 is a perspective view of a rechargeable battery module according to another exemplary embodiment, FIG. 7 is a cross-sectional view taken along the line VII-VII of FIG. 6, and FIG. 8 is a perspective view of a rechargeable battery according to another exemplary embodiment.

In the exemplary embodiment according to the present disclosure illustrated in FIGS. 6-8, the rechargeable battery module 200 has the same or substantially the same structure as that of the rechargeable battery module 200 illustrated in FIG. 1 except for the structure of the first terminal and repetitive description of the same or substantially the same structures may be omitted.

The cap plate 20 included in the rechargeable battery 100 according to the exemplary embodiment illustrated in FIGS. 6-8 has two terminal openings H1 and H2 (e.g., terminal holes) along with the electrolyte injection opening 29 and the vent hole 24.

Also, in the rechargeable battery 100 according to the exemplary embodiment illustrated in FIGS. 6-9, the first terminal 21 is installed in the terminal opening H2 of the cap plate 20 and is electrically connected to the positive electrode 11 of the electrode assembly 10. Accordingly, the positive electrode 11 of the electrode assembly 10 is drawn out of (e.g., drawn to the outside of) the case 15 through the first terminal 21.

For example, the first terminal 21 includes a first column terminal 21b installed in (e.g., extending through) the terminal opening H2 of the cap plate 20 and a first flange 21a integrally formed with the first column terminal 21b outside of the cap plate 20 and flatly protruded in the horizontal direction with respect to the first column terminal 21b. The first flange 21a is disposed in (e.g., is inserted into) a first insulating member 33 and is disposed on the cap plate 20 with a positive electrode gasket 38 therebetween.

Also, the positive electrode gasket 38 seals between the first column terminal 21b and the cap plate 20 and electrically insulates the first column terminal 21b and the cap plate 20 from each other. Also, by installing the first terminal 21 in the cap plate 20, the positive electrode gasket 38 may prevent the electrolyte solution from leaking through the terminal opening H2.

The positive electrode lead tab 51 electrically connects the first terminal 21 to the positive electrode 11 of the electrode assembly 10. For example, the positive electrode lead tab 51 is coupled to the lower end of the first column terminal 21b by caulking.

A positive electrode insulating member 55 is arranged between (e.g., installed between) the positive electrode lead tab 51 and the cap plate 20, thereby electrically insulating the negative electrode lead tab 52 and the cap plate 20 from each other. Also, the positive electrode insulating member 55 is coupled to the cap plate 20 at one side and encloses the positive electrode lead tab 51 and the first column terminal 21b at the other side thereof, thereby stabilizing the connection structure thereof.

Figure 9:
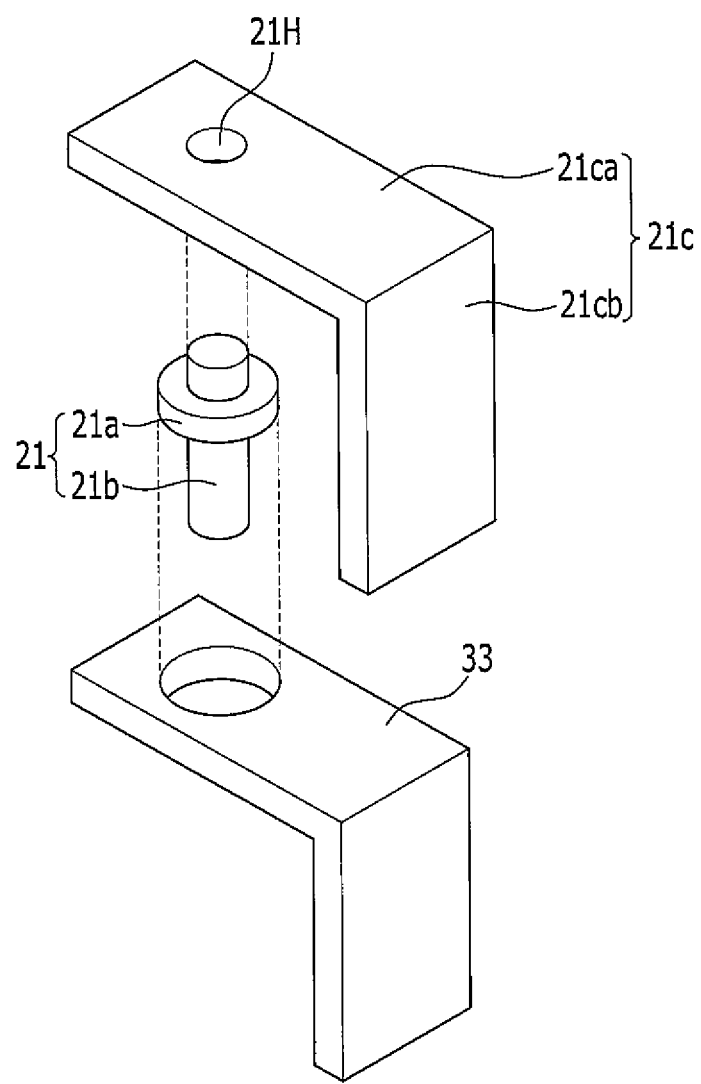
FIG. 9 is an exploded perspective view of a first terminal according to another exemplary embodiment.

FIG. 9 is an exploded perspective view of a first terminal according to another exemplary embodiment.

As shown in FIG. 9, the first sub-terminal 21c includes a first portion 21ca attached to one end of the cap plate 20 and a second portion 21cb integrally formed with the first portion 21ca and attached to an outer surface of the case 15 (e.g., attached to an outside surface end of the case 15).

In this embodiment, the first portion 21ca has an opening 21H (e.g., a through-hole) through which the first terminal 21 extends to be electrically connected to the positive electrode of the electrode assembly. In this embodiment, the first terminal 21 is formed so as to not protrude from the surface of the first portion 21ca (e.g., the first terminal 21 has a flat upper end so as to not protrude from an upper surface of the first portion 21ca).

Also, the first insulating member 33 is inserted between the first portion 21ca and the one end of the cap plate 20 and between the second portion 21cb and the outer surface of the case 15 to electrically insulate the cap plate 20 and the case 15 from the first sub-terminal 21c.

In one embodiment, the first portion 21ca and the second portion 21cb are formed in one body (e.g., are integrally formed) and may be bent (e.g., may have a bent shape bent at a predetermined angle). In this embodiment, the second portion 21cb and the first terminal 21 may be disposed on surfaces of the rechargeable battery 100 that are perpendicular to each other.

As described above, because the rechargeable battery 100 according to embodiments of the present disclosure includes the second sub-terminal 22c and/or the first sub-terminal 21c having a bent shape and, when configuring the rechargeable battery module by using them, both the external upper space and side spaces of the respective rechargeable batteries 100 may be utilized, thereby the connection line and the circuit configuration may be disposed at positions as desired by the user. Accordingly, the battery module may be arranged to have various shapes as desired while efficiently using available space.

Also, because the terminal may have a bent shape, compared with a flat shape, the stability of the battery module is improved, and accordingly, a rechargeable battery module that is less affected by external vibration and impact may be provided.

Furthermore, in the rechargeable battery according to embodiments of the present disclosure, because the first terminal and the second terminal having a bent shape are arranged on or over the outer surfaces of the case and an upper end (e.g., an upper side) of the cap plate, the terminal may be assembled in a final step of a manufacturing process of the rechargeable battery. Accordingly, even if a defect is discovered or created in the terminal during the process of configuring the rechargeable battery module, replacement thereof is easily possible such that excellent process characteristics and affordability may be obtained.

While the present disclosure has been described in connection with what is presently considered to be practical exemplary embodiments, it is to be understood that the present disclosure is not limited to the disclosed embodiments. The present disclosure is intended to cover various modifications and equivalent arrangements included within the spirit and scope of the appended claims and their equivalents.

DESCRIPTION OF SYMBOLS

10: electrode assembly
11: positive electrode
11a: positive electrode coated region
11b: positive electrode uncoated region
12: negative electrode
12a: negative electrode coated region
12b: negative electrode uncoated region
13: separator
15: case
20: cap plate
21c: first sub-terminal
21ca: first portion
21cb: second portion
21: first terminal
22c: second sub-terminal
22ca: third portion
22cb: fourth portion
22: second terminal
32: first insulating member
33: second insulating member
100: rechargeable battery
200: rechargeable battery module

What is claimed is:

1. A rechargeable battery comprising:
an electrode assembly comprising a first electrode, a second electrode, and a separator between the first electrode and the second electrode;
a case accommodating the electrode assembly, the case having an opening therein;
a cap plate separate from the case and sealing the opening of the case;
a first sub-terminal comprising a first portion and a second portion integrally formed with the first portion, the first portion being arranged at one end of the cap plate and the second portion extending below the cap plate toward the case to be on an outer surface of the case;
a second terminal extending through and protruding from the cap plate, the second terminal being electrically connected to the second electrode; and
a second sub-terminal comprising a third portion and a fourth portion integrally formed with the third portion, the third portion being arranged at another end of the cap plate and the fourth portion extending onto another outer surface of the case, the third portion having an opening therein, the second terminal extending into the opening in the third portion.

2. The rechargeable battery of claim 1, wherein the fourth portion and the second terminal are respectively arranged on surfaces which are perpendicular to each other.

3. The rechargeable battery of claim 1, wherein the first portion comprises an insertion portion, the insertion portion having a first terminal inserted therein, and the first terminal is electrically connected to the first electrode.

4. The rechargeable battery of claim 3, wherein the second portion and the first terminal are respectively arranged on surfaces which are perpendicular to each other.

5. The rechargeable battery of claim 1, wherein a first terminal extends through and protrudes from the cap plate, the first terminal being electrically connected to the first electrode, and the first portion has an opening therein into which the first terminal penetrates.

6. The rechargeable battery of claim 5, wherein the second portion and the first terminal are respectively arranged on surfaces which are perpendicular to each other.

7. The rechargeable battery of claim 1, wherein the second sub-terminal has a shape in which the third portion and the fourth portion are bent with respect to each other.

8. The rechargeable battery of claim 1, wherein the first sub-terminal has a shape in which the first portion and the second portion are bent with respect to each other.

9. A rechargeable battery module comprising:
a plurality of rechargeable batteries of claim 1; and
a connection member electrically connecting ones of the plurality of rechargeable batteries.

10. The rechargeable battery module of claim 9, wherein the connection member comprises:
a first connection member coupled to external surfaces of the second portion of the first sub-terminal of adjacent ones of the rechargeable batteries; and
a second connection member alternately arranged with respect to the first connection member and coupled to external surfaces of the fourth portion of the second sub-terminal of adjacent ones of the rechargeable batteries.

11. A rechargeable battery comprising:
an electrode assembly comprising a first electrode, a second electrode, and a separator between the first electrode and the second electrode;
a case accommodating the electrode assembly, the case having an opening;
a cap plate separate from the case and sealing the opening of the case;
a first sub-terminal on one end of the cap plate and extending beyond a periphery of and below the cap plate toward the case to be adjacent an outer surface of the case;
a second terminal extending through and protruding from the cap plate, the second terminal being electrically connected to the second electrode; and
a second sub-terminal connected to the second terminal, on another end of the cap plate, and extending to be adjacent another outer surface of the case, the second sub-terminal being electrically connected to the second electrode via the second terminal.

12. The rechargeable battery of claim 1, further comprising an insulating member between the case and the second sub-terminal and between the cap plate and the second sub-terminal.

* * * * *